US009606528B2

United States Patent
Uesugi

(10) Patent No.: US 9,606,528 B2
(45) Date of Patent: Mar. 28, 2017

(54) NUMERICAL CONTROLLER CONTROLLING ACCELERATION AND DECELERATION ON BASIS OF STOPPING DISTANCE

(71) Applicant: FANUC Corporation, Minamitsuru-gun, Yamanashi (JP)

(72) Inventor: Takahiro Uesugi, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 14/797,395

(22) Filed: Jul. 13, 2015

(65) Prior Publication Data

US 2016/0026175 A1    Jan. 28, 2016

(30) Foreign Application Priority Data

Jul. 22, 2014 (JP) .................................. 2014-148840

(51) Int. Cl.
G05B 19/416 (2006.01)
G05B 19/4103 (2006.01)

(52) U.S. Cl.
CPC ....... *G05B 19/416* (2013.01); *G05B 19/4103* (2013.01)

(58) Field of Classification Search
CPC .............................. G05B 19/25; G05B 19/416
See application file for complete search history.

(56) References Cited

U.S. PATENT DOCUMENTS

| 6,539,275 | B1* | 3/2003 | Mizuno | G05B 19/416 700/159 |
| 2010/0030368 | A1* | 2/2010 | Hon | G01B 5/20 700/195 |
| 2011/0270443 | A1* | 11/2011 | Kamiya | G05B 19/401 700/245 |
| 2011/0276303 | A1* | 11/2011 | Marshall | G01B 21/047 702/141 |
| 2012/0007536 | A1* | 1/2012 | Iwashita | G05B 19/4069 318/573 |

FOREIGN PATENT DOCUMENTS

JP    H11-338530 A    12/1999

* cited by examiner

*Primary Examiner* — Shawki S Ismail
*Assistant Examiner* — Muhammad S Islam
(74) *Attorney, Agent, or Firm* — Drinker Biddle & Reath LLP

(57) ABSTRACT

In a numerical controller for controlling acceleration and deceleration on the basis of a stopping distance, a stopping distance calculation module calculates an acceleration for stopping a drive axis with a probe on the basis of a distance that the drive axis with the probe moves from a current velocity to a stopped state when stopping at a maximum acceleration at which a machine tool does not receive shock, and on the basis of a stopping distance at which the probe is not be damaged. An acceleration and deceleration control module calculates a velocity of the drive axis for each of interpolation periods on the basis of the acceleration calculated by the stopping distance calculation module. An interpolating module outputs data that controls the drive axis, on the basis of the interpolation data and the velocity of the drive axis calculated by the acceleration and deceleration control module.

2 Claims, 4 Drawing Sheets

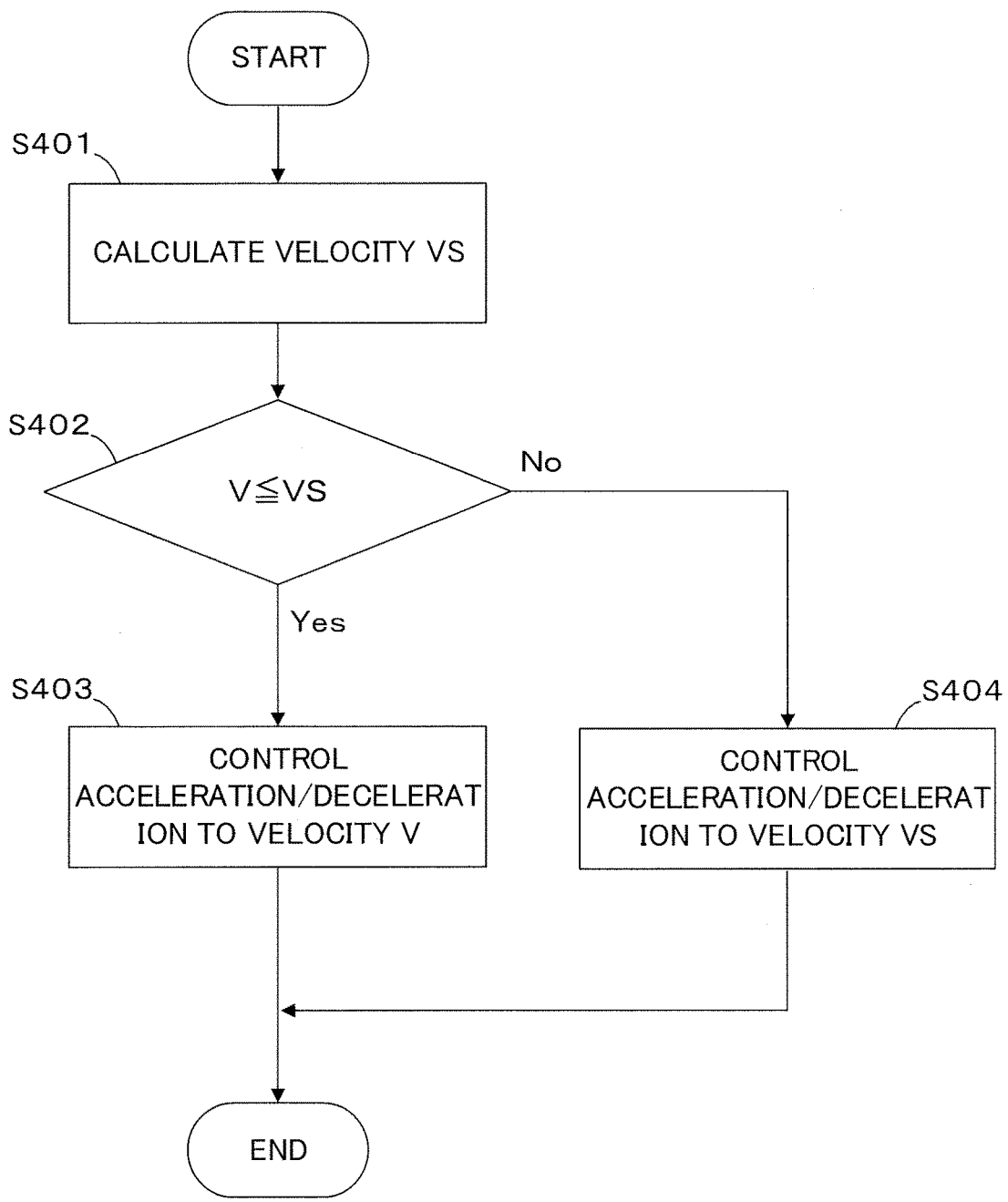

NUMERICAL CONTROLLER CONTROLLING ACCELERATION AND DECELERATION ON BASIS OF STOPPING DISTANCE

RELATED APPLICATION DATA

This application claims priority under 35 U.S.C. §119 and/or §365 to Japanese Application No. 2014-148840 filed Jul. 22, 2014, the entire contents is incorporated herein by reference.

BACKGROUND OF THE INVENTION

1. Field of the Invention

The present invention relates to numerical controllers, and particularly relates to a numerical controller capable of controlling acceleration and deceleration along each axis so as to avoid damaging touch probes and reduce shock received by a machine tool.

2. Description of the Related Art

In machine tools, measuring the shape of a measurement target such as a workpiece is extremely important for high-accuracy machining. A technique that measures the shape of a measurement target by bringing a tip of a touch probe into contact with a surface of the measurement target has been known as a technique for measuring the shape of a measurement target.

In a measurement method according to this conventional technique, the touch probe is supported in a mobile state by a drive axis, and the shape of the measurement target is measured on the basis of the positions of the drive axis where the tip of the touch probe contacts the measurement target.

Meanwhile, a technique for a controller of a machine tool has been disclosed, in which the tangential velocity of a tool is controlled in accordance with a permissible maximum acceleration set for each axis so as to achieve acceleration and deceleration control that makes full use of the acceleration performance of each drive axis in a machine tool (Japanese Patent Application Laid-Open No. 11-338530, for example).

When measuring the shape of a measurement target using touch probes, a signal is generated upon the touch probes contacting the measurement target, and the touch probes are stopped by a numerical controller that receives the signal carrying out stopping control on the drive axis that supports the touch probes in a mobile state. Here, there is a problem in that the touch probes will be damaged if the touch probes are not stopped within a predetermined distance after contacting the measurement target.

However, even when the technique disclosed in Japanese Unexamined Patent Application Laid-Open No. 11-338530, for example, is used to control the axis movement at the permissible maximum acceleration, there are situations where the touch probes cannot stop within the predetermined distance after a stopping command has been issued, resulting in the touch probes being damaged. While a method that sets the permissible maximum acceleration to a high value is conceivable as a way to avoid such situations, using such a setting method results in the drive axis always stopping at an acceleration that is as close to the permissible maximum acceleration as possible. As such, although this method does shorten the stopping distance and avoids damage to the touch probes, the method also increases shock imparted on the machine tool when stopping, resulting in a problem in that a heavy burden is placed on the machine tool.

SUMMARY OF THE INVENTION

Accordingly, an object of the present invention is to provide a numerical controller capable of controlling acceleration and deceleration along each axis so as to avoid damaging touch probes and reduce shock received by a machine tool.

A numerical controller that controls acceleration and deceleration on the basis of a stopping distance according to the present invention is configured to control a machine tool having a plurality of drive axes, a probe being provided on at least one of the drive axes, on the basis of a machining program, and measure a workpiece by moving the drive axis provided with the probe and the workpiece relative to each other. The numerical controller includes: a command analysis unit configured to output command data specifying an operation of the drive axis on the basis of the machining program; an interpolation unit configured to, on the basis of the command data output by the command analysis unit, carry out an interpolation process for calculating interpolation data expressing positions of the drive axis on an operation path in each of interpolation periods; an acceleration and deceleration control unit configured to calculate a velocity of the drive axis in each interpolation period on the basis of the command data output by the command analysis unit and the interpolation data calculated by the interpolation unit; and a stopping distance calculation unit configured to calculate a stopping acceleration of the drive axis on the basis of a current velocity and acceleration of the drive axis. The stopping distance calculation unit is configured to calculate an acceleration to stop the drive axis provided with the probe, on the basis of a distance that the drive axis provided with the probe moves from the current velocity to a stopped state in the case where the drive axis is stopped at a maximum acceleration at which the machine tool does not receive shock, and on the basis of a stopping distance at which the probe is not be damaged. The acceleration and deceleration control unit is configured to calculate a velocity of the drive axis in each interpolation period on the basis of the acceleration to stop the drive axis provided with the probe calculated by the stopping distance calculation unit. The interpolation unit outputs data that controls the drive axis, on the basis of the interpolation data and the velocity of the drive axis calculated by the acceleration and deceleration control unit.

The acceleration and deceleration control unit may calculate a permissible velocity, the permissible velocity being a velocity of the drive axis provided with the probe and a velocity at which the probe can be stopped within a distance at which the probe is not damaged in the case where the drive axis provided with the probe is stopped at a maximum permissible acceleration of the machine tool from the stated velocity, and may calculate a velocity of the drive axis provided with the probe so as to fall within a range that does not exceed the permissible velocity.

By configuring the present invention as described above, the acceleration and deceleration of a drive axis provided with touch probes is controlled to stop within a specified distance using a control procedure for controlling acceleration and deceleration so as to stop within a specified distance following a stop command, and a control procedure for controlling acceleration and deceleration and restricting a velocity so as not to exceed a velocity at which stopping is possible within the specified distance in the case of stopping at a maximum acceleration. This ensures that the drive axis stops at the necessary acceleration, and thus it is possible to provide a numerical controller capable of avoiding damage to the touch probes and capable of reducing shock received by the machine tool.

BRIEF DESCRIPTION OF THE DRAWINGS

These and other objects and features of the present invention will be made clear through the following detailed descriptions when taken along with the appended drawings.

FIG. 4 is a flowchart illustrating an acceleration and deceleration control process according to the embodiment of the present invention.

DETAILED DESCRIPTION OF THE PREFERRED EMBODIMENTS

Figure 1:
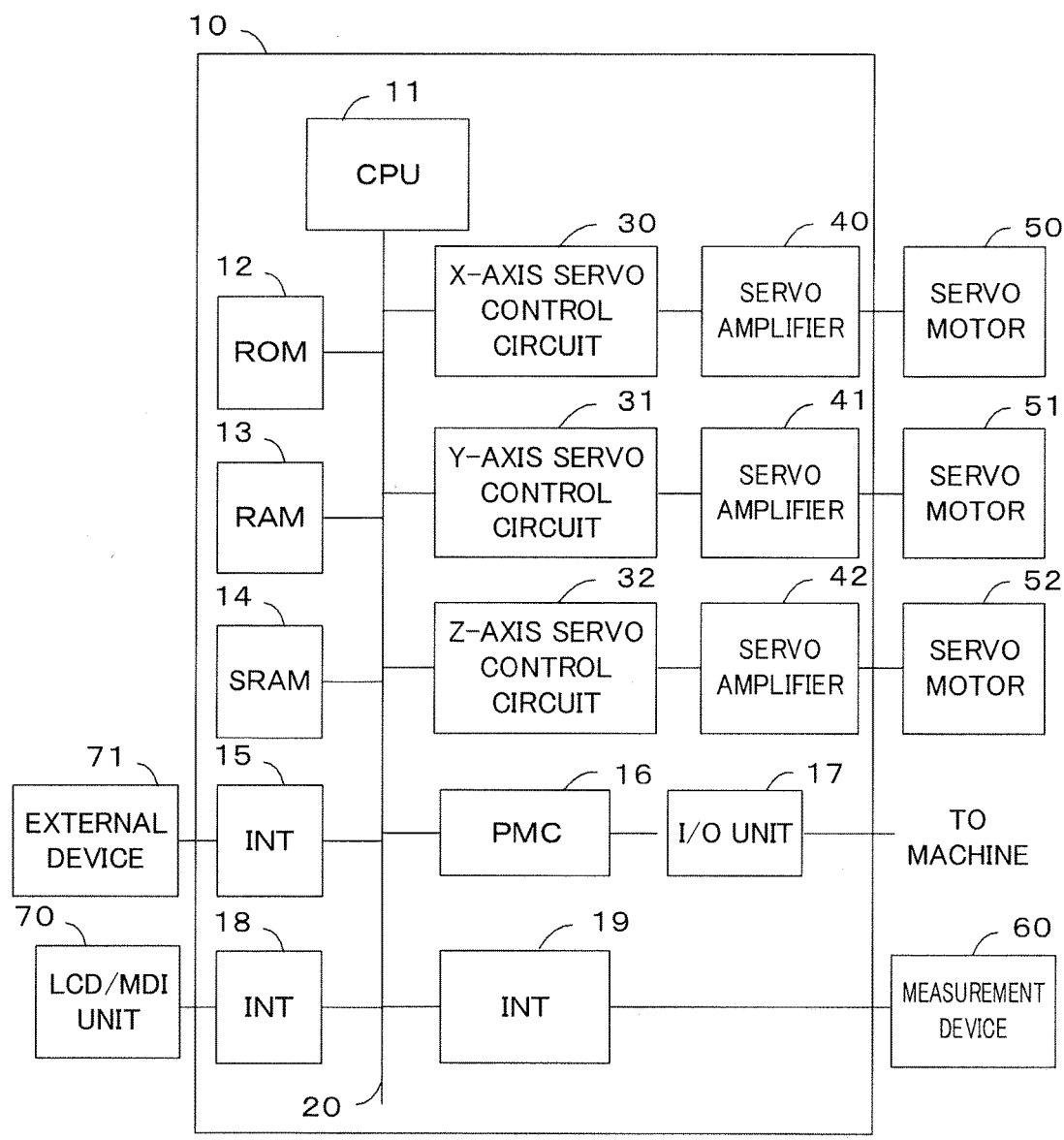
FIG. 1 is a block diagram illustrating primary components of a numerical controller according to an embodiment of the present invention.

FIG. 1 is a block diagram illustrating primary components of a numerical controller according to an embodiment of the present invention. A processor (CPU) 11 of a numerical controller 10 is a processor that controls the numerical controller 10 as a whole. The processor 11 loads a system program stored in a ROM 12 via a bus 20 and controls the numerical controller 10 as a whole in accordance with the system program. Calculation data, display data, various types of data inputted by an operator via an LCD/MDI unit 70, and so on are temporarily stored in a RAM 13.

A battery (not illustrated) backed-up SRAM 14 functions as a non-volatile memory that maintains a storage state even when the numerical controller 10 is powered off. A program for causing the numerical controller to execute an acceleration and deceleration control process, a machining program loaded via an interface 15, a machining program inputted via the LCD/MDI unit 70, and so on are stored into the SRAM 14. Various types of system programs for carrying out processes for an editing mode that is required to create and edit machining programs, processes for automatic operation, and so on are written into the ROM 12 in advance.

The interface 15 is an interface for an external device that can be connected to the numerical controller 10, and an external device 71 such as an external storage device is connected thereto. Machining programs and the like are loaded from the external storage device. A Programmable Machine Controller (PMC) 16 controls auxiliary devices or the like provided on the machine tool side using sequence programs installed in the numerical controller 10.

In other words, signals required by the auxiliary devices are converted by these sequence programs and output to the auxiliary devices from an I/O unit 17 in accordance with an M function, an S function, and a T function instructed by a machining program. Auxiliary devices such as various types of actuators and the like are operated in response to these output signals. Furthermore, signals from various types of switches and the like in a console panel provided in a main body of the machine tool are received, processed as necessary, and passed to the processor 11.

Current positions of the respective axes of the machine tool, alarms, parameters, and image signals such as image data are sent to the LCD/MDI unit 70 and displayed in a display thereof. The LCD/MDI unit 70 is a manual data input device including a display, a keyboard, and the like, and an interface 18 receives data from the keyboard of the LCD/MDI unit 70 and outputs the data to the processor 11.

Servo control circuits 30 to 32 for respective X, Y, and Z axes of the machine tool receive commands from the processor 11 for movement along the each axis, and the commands for the respective axes are output to servo amplifiers 40 to 42, respectively. The servo amplifiers 40 to 42 receive these commands and drive servo motors 50 to 52 for the respective axes of the machine tool. The servo motors 50 to 52 for the respective axes each has a pulse coder for positional detection built therein, and a position signal from the pulse coder is fed back as a pulse string.

An interface 19 is connected to a measurement device 60 such as a touch probe, receives detection signals and the like output from the measurement device 60, and passes the signals and the like to the processor 11.

Figure 2:
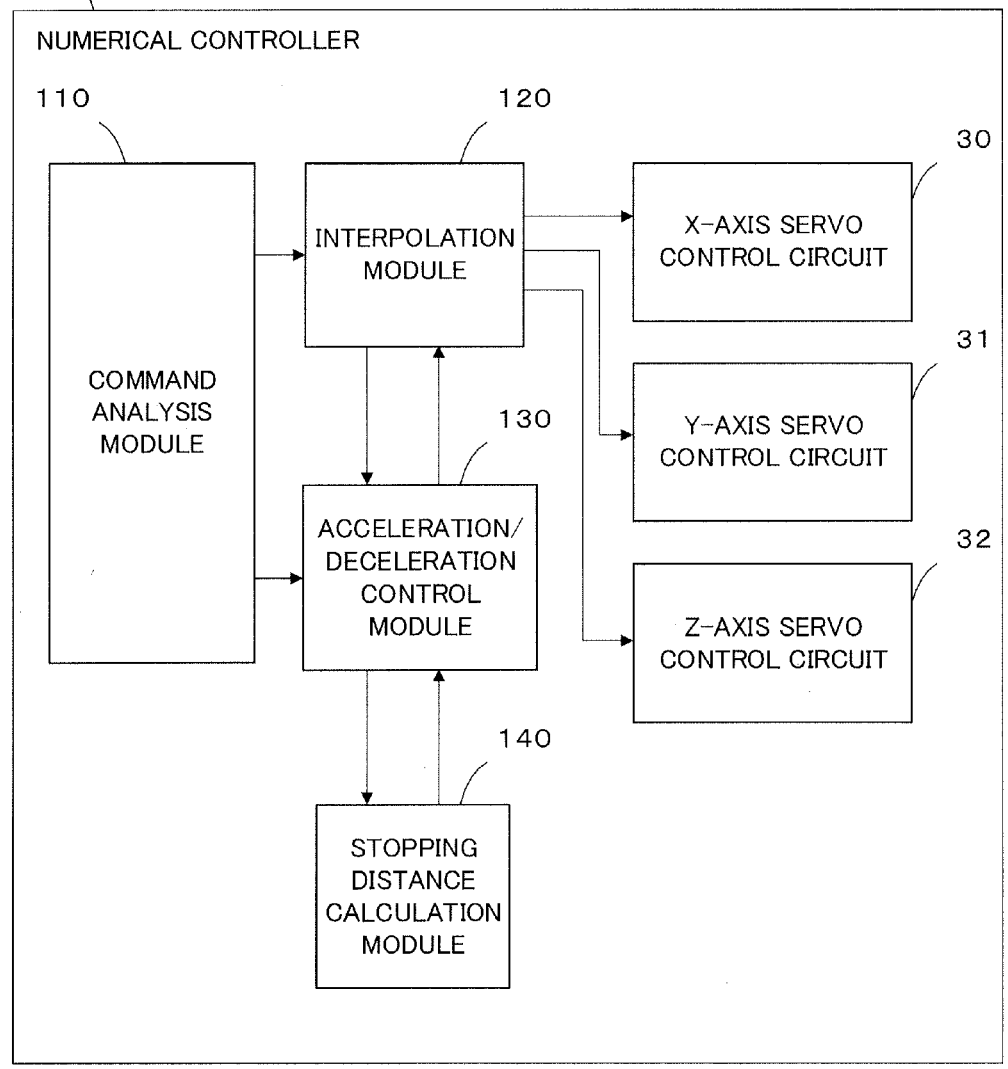
FIG. 2 is a functional block diagram illustrating the numerical controller according to the embodiment of the present invention.

FIG. 2 is a functional block diagram illustrating the numerical controller 10 according to the embodiment of the present invention.

The numerical controller 10 includes a command analysis module 110, an interpolation module 120, an acceleration and deceleration control module 130, and a stopping distance calculation module 140.

Compared to conventional techniques, the numerical controller 10 according to the present embodiment has a feature of including the stopping distance calculation module 140 that finds a stopping distance.

The command analysis module 110 analyzes program commands of a machining program loaded from the SRAM 14 or the like, stopping commands output from the system program or the like, and converts the commands into data used by the interpolation module 120 and the acceleration and deceleration control module 130. The interpolation module 120 generates interpolation data by interpolating points on a command path at an interpolation period on the basis of the data output by the command analysis module 110, and controls the respective servo axes on the basis of that data and data output from the acceleration and deceleration control module 130.

The acceleration and deceleration control module 130 carries out an acceleration and deceleration control process and calculates a velocity of each of drive axis for each interpolation period on the basis of the data output by the command analysis module 110, the interpolation data output by the interpolation module 120, and a command output as a result of a stopping distance calculation process performed by the stopping distance calculation module 140 (described later). The velocity of each drive axis to be controlled is calculated on the basis of a command velocity included in the data analyzed by the command analysis module 110, configuration values such as a position and an acceleration and deceleration time constant in each interpolation period for each axis included in the interpolation data output by the interpolation module 120, and so on.

The stopping distance calculation module 140 calculates a stopping distance for a drive axis that supports a probe in a mobile state on the basis of the velocity of each drive axis in each interpolation period obtained from the acceleration and deceleration control module 130 and an acceleration value calculated from the velocity of each drive axis in each interpolation period, and outputs a stopping acceleration determined on the basis of the calculated stopping distance to the acceleration and deceleration control module 130.

Note that the position, velocity, acceleration, and so on in each interpolation period are pieces of information obtained by conventional numerical controllers that control machine tools, and thus methods for calculating that information and so on will not be described in detail here.

Next, an overview of the stopping distance calculation process executed by the stopping distance calculation module 140 according to the present embodiment will be given.

The stopping distance calculation process according to the present embodiment is carried out during stopping control for stopping a drive axis supporting touch probes in a mobile state after the touch probes has contacted a measurement target when measuring the shape of the measurement target using the touch probes; the stopping distance calculation process calculates, on the basis of the current velocity and acceleration of the drive axis, a suitable stopping distance capable of avoiding damage to the machine tool, the touch probes, and so on, through the procedure described hereinafter.

First, a maximum acceleration A1 at which the machine tool will not receive shock is specified. The maximum acceleration A1 may be set in advance as a configuration parameter or the like of the numerical controller 10 stored in the SRAM 14 or the like.

Next, a stopping distance LA when the touch probes contact the measurement target at a velocity V and stops at the acceleration A1 is calculated through the following Formula 1.

$$LA = \frac{V^2}{2 \times A1} \quad \text{(Formula 1)}$$

Furthermore, it is determined whether or not Formula 2 holds true, with LS serving as a stopping distance at which the touch probes are not damaged. Note that the stopping distance LS at which the touch probes are not damaged may be set in advance as a configuration parameter or the like of the numerical controller 10 stored in the SRAM 14 or the like.

$$LA \leq LS \quad \text{(Formula 2)}$$

Then, in the case where the stopping distance LA when the touch probes are stopped at the acceleration A1 and the stopping distance LS at which the touch probes are not damaged fulfill Formula 2, a command to stop at the acceleration A1 is output to the acceleration and deceleration control module 130, whereas in the case where Formula 2 is not fulfilled, an acceleration AS for stopping at the stopping distance LS is calculated through Formula 3, and a command to stop at the acceleration AS is output to the acceleration and deceleration control module 130.

$$AS = \frac{V^2}{2 \times LS} \quad \text{(Formula 3)}$$

Figure 3:
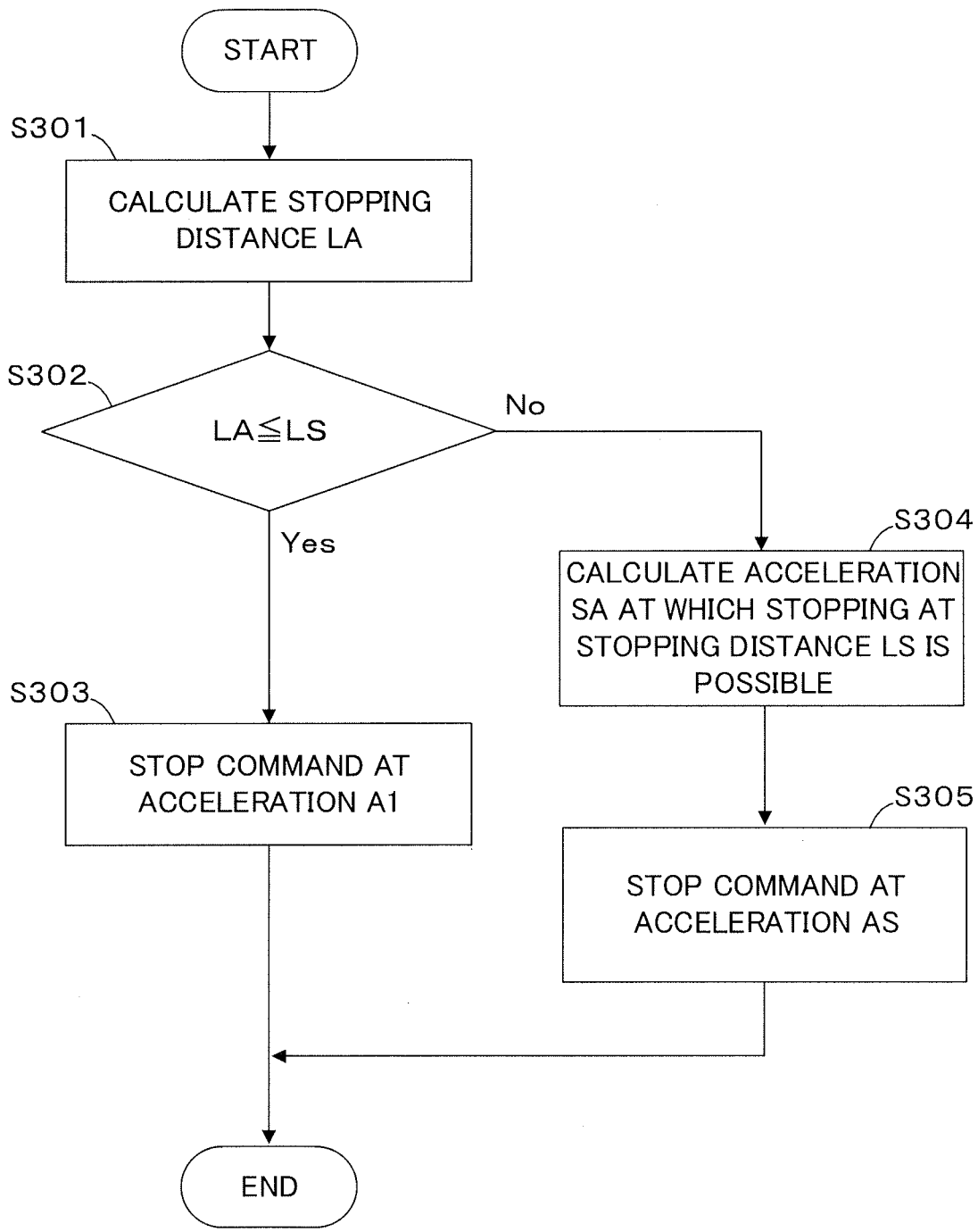
FIG. 3 is a flowchart illustrating a stopping distance calculation process according to the embodiment of the present invention.

FIG. 3 is a flowchart illustrating the stopping distance calculation process executed by the stopping distance calculation module 140.
[S301]
The stopping distance LA for stopping at the acceleration A1 is calculated on the basis of the maximum acceleration A1 at which the machine tool does not receive shock and the velocity V of the touch probes.
[S302]
The stopping distance LA for stopping at the acceleration A1 calculated in S301 is compared with the stopping distance LS at which the touch probes are not damaged. The process advances to S303 in the case where the stopping distance LA for stopping at the acceleration A1 is less than or equal to the stopping distance LS at which the touch probes are not damaged, and advances to S304 in the case where the stopping distance LA for stopping at the acceleration A1 is greater than the stopping distance LS at which the touch probes are not damaged.
[S303]
A command to stop at the acceleration A1 is output to the acceleration and deceleration control module 130.
[S304]
The acceleration AS for stopping at the stopping distance LS is calculated.
[S305]
A command to stop at the acceleration AS is output to the acceleration and deceleration control module 130.

The foregoing has described, as the stopping distance calculation process executed by the stopping distance calculation module 140, an example of calculating a suitable stopping distance capable of avoiding damage to the machine tool, the touch probes, and so on during stopping control carried out after the touch probes has come into contact with the measurement target when measuring the shape of the measurement target using the touch probes. However, as another embodiment of the present invention, the acceleration and deceleration control module 130 can also be configured to output a command for controlling the velocity of the drive axis that supports the touch probes so that, when measuring the shape of the measurement target using the touch probes, the touch probes can stop within a distance specified in the case where the touch probes decelerates and stops at a maximum permissible acceleration after making contact with the measurement target.

Next, an overview of the acceleration and deceleration control process executed by the acceleration and deceleration control module 130 according to another embodiment will be given.

First, a maximum permissible acceleration A2, at which the machine tool will receive shock but the acceleration is permissible, is defined. The maximum permissible acceleration A2 may be set in advance as a configuration parameter or the like of the numerical controller 10 stored in the SRAM 14 or the like.

Next, a permissible velocity VS, at which the touch probes can be stopped at the stopping distance LS without being damaged, in the case where the touch probes are stopped at the maximum permissible acceleration A2 after contacting the measurement target, is calculated through Formula 4.

$$VS = \sqrt{2 \times LS \times A2} \quad \text{(Formula 4)}$$

Furthermore, it is determined whether Formula 5 holds true, with V representing a velocity specified by a movement command obtained by the command analysis module 110 analyzing the machining program.

$$V \leq VS \quad \text{(Formula 5)}$$

In the case where it is determined that the specified velocity V is less than or equal to the permissible velocity VS, a velocity of the drive axis in each interpolation period for accelerating and decelerating to the velocity V is calculated and output to the interpolation module 120, whereas in the case where it is determined that the specified velocity V is greater than the permissible velocity VS, a velocity of the drive axis in each interpolation period for accelerating and decelerating to the velocity VS is calculated and output to the interpolation module 120.

FIG. 4 is a flowchart illustrating an acceleration and deceleration control process executed by the acceleration and deceleration control module 130.

[S401]

The permissible velocity VS at which the touch probes can stop at the stopping distance LS without damage is calculated on the basis of the stopping distance LS at which the touch probes are not damaged and the maximum permissible acceleration A2.

[S402]

The velocity V specified by the movement command obtained from the analysis of the machining program is compared with the permissible velocity VS calculated in S401. The process advances to S403 in the case where the velocity V is less than or equal to the permissible velocity VS, and advances to S404 in the case where the velocity V is greater than the permissible velocity VS.

[S403]

The velocity of the drive axis in each interpolation period for accelerating and decelerating to the velocity V is calculated and output to the interpolation module 120.

[S404]

The velocity of the drive axis in each interpolation period for accelerating and decelerating to the velocity VS is calculated and output to the interpolation module 120.

The invention claimed is:

1. A numerical controller for controlling acceleration and deceleration on the basis of a stopping distance, configured to control a machine tool having a plurality of drive axes, a probe being provided on at least one of the drive axes, on the basis of a machining program, and, measure a workpiece by moving the drive axis provided with the probe and the workpiece relative to each other, the numerical controller comprising:
  a command analysis unit configured to output command data specifying an operation of the drive axis on the basis of the machining program;
  an interpolation unit configured to, on the basis of the command data output by the command analysis unit, carry out an interpolation process for calculating interpolation data expressing positions of the drive axis on an operation path in each of interpolation periods;
  an acceleration and deceleration control unit configured to calculate a velocity of the drive axis in each interpolation period on the basis of the command data output by the command analysis unit and the interpolation data calculated by the interpolation unit; and
  a stopping distance calculation unit configured to calculate a stopping acceleration of the drive axis, on the basis of a current velocity and acceleration of the drive axis, and,
  the stopping distance calculation unit is configured to calculate an acceleration to stop the drive axis provided with the probe, on the basis of
    a distance that the drive axis provided with the probe moves from the current velocity to a stopped state in the case where the drive axis is commanded to stop when the drive axis is at a maximum acceleration at which the machine tool does not receive shock, and
    a stopping distance at which the probe is not damaged;
  the acceleration and deceleration control unit is configured to calculate a velocity of the drive axis in each interpolation period on the basis of the acceleration to stop the drive axis provided with the probe calculated by the stopping distance calculation unit; and
  the interpolation unit is configured to output data that controls the drive axis, on the basis of the interpolation data and the velocity of the drive axis calculated by the acceleration and deceleration control unit.

2. The numerical controller that controls acceleration and deceleration on the basis of a stopping distance according to claim 1; wherein
  the acceleration and deceleration control unit is configured to calculate a permissible velocity, the permissible velocity being a velocity of the drive axis provided with the probe and a velocity at which the probe can be stopped within a distance at which the probe is not damaged in the case where the drive axis provided with the probe is stopped at a maximum permissible acceleration of the machine tool from the velocity, and calculate a velocity of the drive axis provided with the probe so as to fall within a range that does not exceed the permissible velocity.

* * * * *